United States Patent
Chan et al.

(10) Patent No.: US 9,037,153 B2
(45) Date of Patent: May 19, 2015

(54) METHODS AND APPARATUS FOR A VIRTUAL CONTENT CHANNEL STRUCTURE IN A BROADBAND WIRELESS NETWORK WITH LOCATION-BASED CONTENT

(75) Inventors: Mary S. Chan, Chatham, NJ (US); James W. McGowan, Whitehouse Station, NJ (US); Michael C Recchione, Nutley, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2476 days.

(21) Appl. No.: 11/614,398

(22) Filed: Dec. 21, 2006

(65) Prior Publication Data

US 2008/0153461 A1 Jun. 26, 2008

(51) Int. Cl.
- H04W 24/00 (2009.01)
- H04W 72/00 (2009.01)
- G06F 17/30 (2006.01)
- H04W 4/02 (2009.01)
- H04L 29/08 (2006.01)

(52) U.S. Cl.
CPC ......... *H04W 72/005* (2013.01); *G06F 17/3087* (2013.01); *H04W 4/02* (2013.01); *H04L 67/327* (2013.01)

(58) Field of Classification Search
USPC ................... 455/3.01, 456.1, 414.2
See application file for complete search history.

(56) References Cited

U.S. PATENT DOCUMENTS

| | | | |
|---|---|---|---|
| 7,076,202 B1 * | 7/2006 | Billmaier | 455/3.04 |
| 7,305,244 B2 * | 12/2007 | Blomqvist et al. | 455/456.5 |
| 2002/0078455 A1 * | 6/2002 | Nakagawa et al. | 725/52 |
| 2002/0090943 A1 * | 7/2002 | Kwon | 455/433 |
| 2004/0248561 A1 | 12/2004 | Nykanen | |
| 2006/0085829 A1 | 4/2006 | Dhodapkar | |
| 2007/0078993 A1 * | 4/2007 | Issa | 709/229 |
| 2007/0124771 A1 * | 5/2007 | Shvadron | 725/61 |
| 2007/0129003 A1 * | 6/2007 | Dunko | 455/3.06 |

FOREIGN PATENT DOCUMENTS

EP 1 130 524 A 9/2001

* cited by examiner

*Primary Examiner* — Marisol Figueroa
(74) *Attorney, Agent, or Firm* — Ryan, Mason & Lewis, LLP

(57) ABSTRACT

Methods and apparatus are provided for a virtual content channel structure in a broadband wireless network with location-based content. Broadband content is delivered to a mobile terminal in a wireless network by receiving a request for a content channel from the mobile terminal; and translating the requested content channel to a corresponding content item based on the requested content channel and a date and time associated with the request (and optionally, a location of the request), wherein a content source associated with the corresponding content item is transmitted to the mobile terminal using a communication channel associated with the user. The content source comprises, for example, the corresponding content item or an address or a link associated with the corresponding content item. The corresponding content item can include content components that are based on a location of the mobile terminal.

13 Claims, 5 Drawing Sheets

METHODS AND APPARATUS FOR A VIRTUAL CONTENT CHANNEL STRUCTURE IN A BROADBAND WIRELESS NETWORK WITH LOCATION-BASED CONTENT

CROSS-REFERENCE TO RELATED APPLICATION

The present application is related to U.S. patent application Ser. No. 11/614,371, entitled "Methods and Apparatus for Distributed Multimedia Content Supporting User Mobility," filed contemporaneously herewith, assigned to the assignee of the present invention and incorporated by reference herein.

FIELD OF THE INVENTION

The present invention relates generally to wireless communication techniques, and mote particularly, to methods and apparatus for distributing multimedia content in a wireless network environment.

BACKGROUND OF THE INVENTION

Wireless networks are constantly evolving and many networks now offer significantly increased bandwidth relative to prior generations of wireless networks. A number of mobile service providers now offer traditional media broadcast services, similar to those offered by cable or satellite television service providers. The wireless links in a 1× Evolution-Data Optimized (EVDO) network, for example, between the distributed base stations and the mobile terminals, provide sufficient bandwidth (for example, on the order of 50 MBps) for such emerging media broadcast services. The EVDO standard has been adopted by the 3rd Generation Partnership Project 2 (3GPP2) collaboration, as part of the CDMA2000 family of standards. Similarly, the Universal Mobile Telecommunications System (UMTS) is a competing broadband wireless standard that has also been adopted by a number of mobile telephony service providers.

Consumers today have a wide selection of content available from many sources, including traditional broadcast television networks and the Internet (World Wide Web) The wide variety of available programming and content makes it increasingly challenging for a user to conveniently identify content of interest. Existing wireless media broadcast systems generally employ a "pull" model, whereby a user selects the content to be downloaded from a flat list, a hierarchical list, or by searching, fox example, using a search engine, such as Google™.

Traditional media broadcasters, on the other hand, generally employ a "push" model in a "channel" structure, in which simultaneous streams of content (i.e., "channels") are available to the end user, who can select a desired channel. Identical content is typically broadcast to all subscribers on a given channel. With the advent of two-way digital systems, some channels were added for custom programming, such as video-on-demand, where a user receives and controls their own individual content stream. Historically, television viewers select television programs of interest by reviewing a television program guide, such as a grid that lists the available television programs by date and time, channel and title. A number of electronic program guides (EPGs) exist that allow television viewers to select television programs in accordance with personal preferences.

The notion of a "channel" is different in a wireless broadband network environment, however; where the channel structure allows simultaneous users to connect over the same physical air interface to the network. Since wireless networks were primarily designed for carrying voice traffic, they adhere to the telephony model, in which each mobile terminal occupies an individual channel. The channel is used to relate the user and the network, not the user and different streams of content. Accordingly, each user typically has a single personal channel over which any content can be provided.

A need exists for a virtual channel structure that can be overlaid on the otherwise unstructured distribution of content in broadband wireless network. A further need exists for methods and apparatus that provide wireless delivery of customized content based on the location or other preferences of the user in a wireless network.

SUMMARY OF THE INVENTION

Generally, methods and apparatus are provided for a virtual content channel structure in a broadband wireless network with location-based content. According to one aspect of the invention, broadband content is delivered to a mobile terminal in a wireless network by receiving a request for a content channel from the mobile terminal, and translating the requested content channel to a corresponding content item based on the requested content channel and a date and time associated with the requests wherein a content source associated with the corresponding content item is transmitted to the mobile terminal using a communication channel associated with the user. The content source comprises one or mote of the corresponding content item or an address or a link associated with the corresponding content item. The corresponding content item optionally includes one or more content components that are based on a location of the mobile terminal. The date and time associated with the request can be one or more of a current date and time of the request and a requested date and time.

According to a further aspect of the invention, broadband content is delivered to a mobile terminal in a wireless network by receiving a request for a content channel from the mobile terminal; determining a location of the mobile terminal; and translating the requested content channel to a corresponding content item based on the requested content channel, a date and time associated with the request and the location, wherein a content source associated with the corresponding content item is transmitted to the mobile terminal using a communication channel associated with the user. The corresponding content item optionally includes one or more content components that are based on the location of the mobile terminal, such as a regional advertisement or regional content based on the location.

A more complete understanding of the present invention, as well as further features and advantages of the present invention, will be obtained by reference to the following detailed description and drawings.

DETAILED DESCRIPTION

Figure 1:
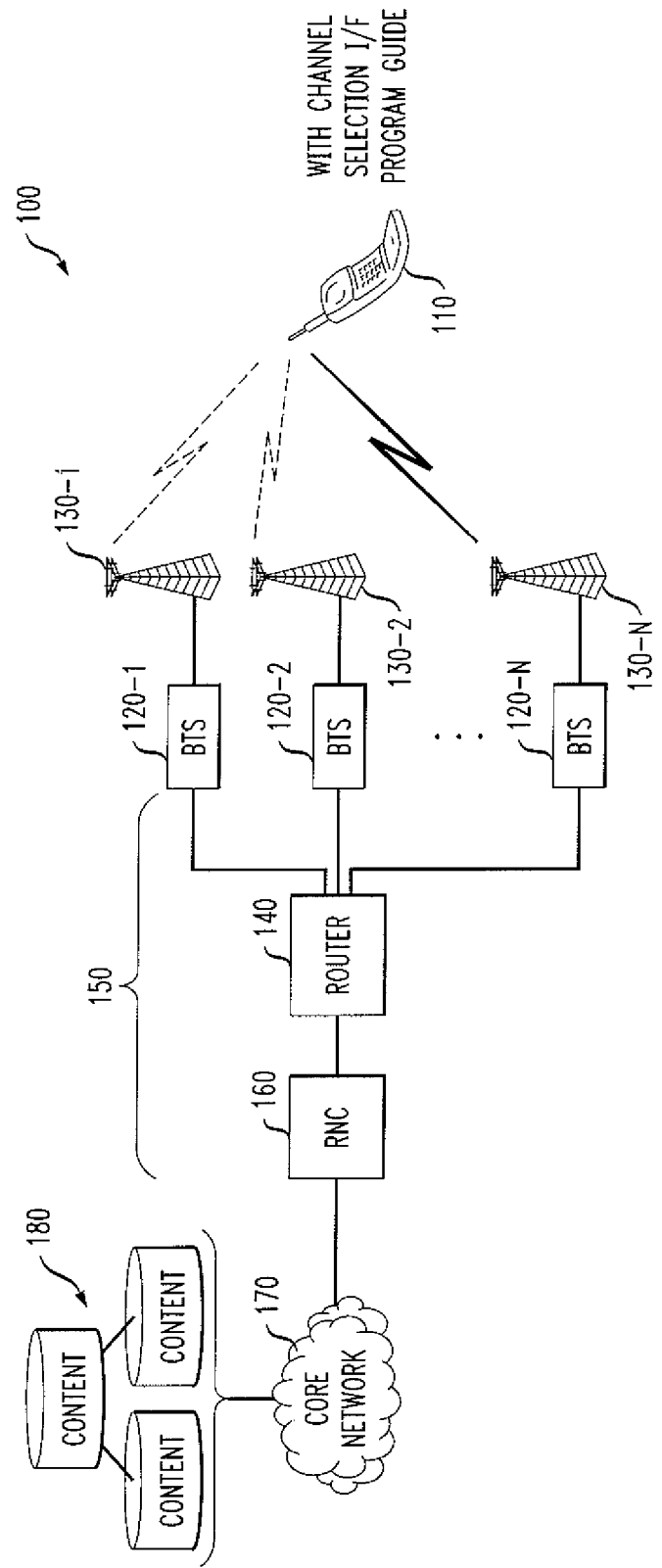
FIG. 1 illustrates an exemplary wireless network environment in which the present invention can operate.

The present invention provides a virtual channel structure that can be overlaid on the otherwise unstructured distribution of content on a broadband wireless network. The disclosed model is a hybrid model that optionally allows content to be "pushed" to users, as well as "pulled" by users. For example, a music channel can push a particular video to all subscribers watching, like traditional television, or allow a user to select from a number of available videos. Even with a pushed video, links to an artist's site, or to download a song ("pull" content) can be overlaid. Local content components, such as local advertisements, can be inserted into the content channel based upon the user's location.

According to one aspect of the invention, methods and apparatus are provided for wireless delivery of customized content based on the location or other preferences of the user in a wireless network. For instance, a personalized site can provide local sports information to a user with an interest in sports, with local information and advertisements that are both local and relevant to the selected interests. As used herein, the term "communication channel" is used to relate the user and the network, and the term "content channel" is used to relate the user and different streams of content.

According to the disclosed hybrid model, content is arranged in content channels on a broadband wireless network. The bandwidth is divided into separate communication channels with each user supported by a single content channel. However, content is arranged and presented to the user as if the content itself were provided using a number of communication channels. This approach appeals to the business of broadcast content, in which networks, advertisers and other related industries have carved niches in a familiar arrangement. In particular, a broadcaster can license content channels to networks, which provide content according to existing practice. In addition, end users are familiar with this arrangement, and are accustomed to such things as paying for basic and premium services, interstitial commercials (i.e., traditional television commercials), channels changing across geographic regions, and content being grouped by gem e, such as a news channel and a movie channel.

According to another benefit of the invention, content channels can be licensed nationally (i.e., the entire network), regionally (i.e., a portion of the network) or locally (i.e., to the specific location of the terminal). The content channels can be sold to end users in packages that include different subgroups of channels, or sold individually.

As previously indicated, one aspect of the invention creates a virtual channel structure that mimics and expands the existing broadcast television and radio business model, while adding web-like features. This allows industry participants, such as networks and advertisers, to interface with mobile broadcasters in much the same way they interface with traditional cable and satellite broadcasters. In addition, another aspect of the invention allows local content information to be used with this channel structure. Thus, for example, a single nationwide weather channel can provide local content components, such as local forecasts, with local advertisements and local weather maps.

As discussed below in conjunction with FIG. 3, content in the network is labeled according to the communication channel, broadcast time, and other relevant features. A user's location information can be combined with his or her local preferences and his or her selected communication channel to provide relevant content. The communication channel moves beyond a traditional broadcast model, to more of a portal that changes content automatically as the user is mobile, or allows stickiness for content the user would like as static (such as a hometown news report, even when traveling).

Wireless Network Environment

FIG. 1 illustrates a wireless network environment 100 in which the present invention can operate. The exemplary wireless network environment 100 is based on an exemplary 1×EV-DO network implementation. As shown in FIG. 1, the wireless network environment 100 comprises one or more mobile terminals, such as the mobile terminal 110, having a wireless connection to a base transceiver station (BTS) 120-1 through 120-N. Each base station 120-1 through 120-N typically has an associated antenna 130-1 through 130-N to provide an air inter face to the mobile terminals 110.

The mobile terminal 110 (also referred to as a terminal herein) may be implemented, for example, as a cellular telephone, a personal computer, laptop computer or another device that can establish a connection over a wireless network. The terminal 110 typically monitors the radio signal strength to several BTSs 120, in a known manner. Based on the strength of the signals associated with each possible path, a path is selected between the terminal 110 to the core network. As shown in FIG. 1, the BTSs 120 connect through a router 140 to a radio network controller (RNC) 160 to a core network (core) 170. A content cluster 180 is accessible through the core network 170. To play content, such as a broadcast song, on a mobile terminal, the content must be delivered from the cluster 180, through a series of network components, to the appropriate RNC 160, which sends the content to the current BTS 120 that is communicating with the terminal 110, which in turn forwards the content to the terminal 110.

Figure 2:
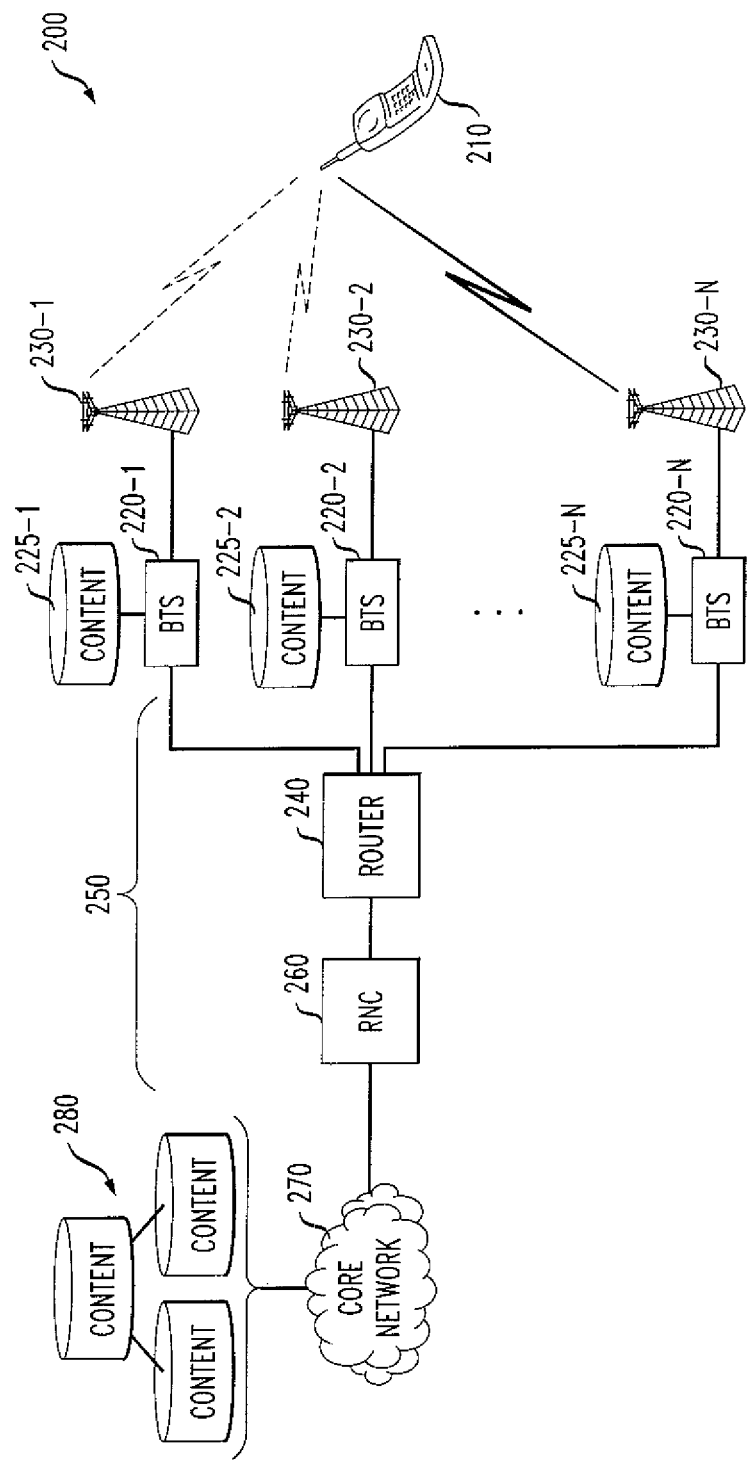
FIG. 2 illustrates an alternate wireless network environment in which the present invention can operate.

FIG. 2 illustrates an alternative wireless network environment 200. The exemplary wireless network environment 200 is based on the illustrative EVDO wireless network environment 100 of FIG. 1, as modified by out United States Patent Application, entitled "Methods and Apparatus for Distributed Multimedia Content Supporting User Mobility," to provide distributed content that is stored in servers associated with the BTSs 220. Thus, the elements of FIG. 2 perform in a similar manner to the corresponding elements of FIG. 1, unless otherwise indicated. While the present invention is illustrated herein in the context of an exemplary EVDO network, the present invention can be applied in any broadband wireless network implementation, such as UMTS, as would be apparent to a person of ordinary skill in the art.

As shown in FIG. 2, one or mote mobile content servers, such as content servers 225-1 through 225-N, are now associated with each BTS 220-1 through 220-N. The content cluster 280 at the core network 270 typically remains, but its functionality is somewhat modified, as discussed herein. The content cluster 280 now serves as a content distribution server (CDS) to distribute the content to each mobile content server (MCSs) 225. The CDS 280 typically warehouses the media content in a location behind the backhaul link 250. The MCSs 225 mirror relevant sections of content in front of the backhaul link 250.

As discussed further below in conjunction with FIG. 5, the BTS 220 can intercept requests for content that is stored locally in the MCS 225, and distribute that content locally, avoiding the backhaul link 250. Some information, such as signaling information for authentication and billing information, may still be sent to the core 270.

Content Retrieval and Storage

A user selects a content channel on a mobile terminal 110, that signals the selection over the air interface. The terminal 110 provides one or more content selection interfaces, such as an electronic program guide with a listing of channels, and/or a mechanism to select or "flip through" the channels, such as a numeric keypad for entry of a desired content channel, and/or channel up/down buttons. The signal may be, for example, a SIP (Session Initiation Protocol) message over an IP (Internet Protocol) connection. The signal is routed to the content store, such as the server cluster 180 (FIG. 1).

Authentication can be handled by the cluster or a proxy server, which must ensure that the user has rights to view the selected content, as discussed further below in conjunction with FIG. 5. Premium services could allow expired, not-yet-valid or out-of-region content to be shown to authorized users. An optional emergency services override can direct all users to a single broadcast. This implements the Emergency Alert System (EAS, which replaces the Emergency Broadcast System), mandatory for existing broadcasters in the United States on Dec. 31, 2006 (although the applicability of the EAS to mobile broadcasters is undetermined).

The server 180 stores the content with indicators as to which content belongs to which channel, as discussed further below in conjunction with FIG. 3. New content can be placed on the servers 180 by the channel licensee in a known manner. Content can optionally be stored with a "valid time" and "valid region" indicator, which delivers the correct content at the correct time to the correct location. This information associated with the content can be stored in a content database 300, as discussed further below in conjunction with FIG. 3

Virtual Channel Structure

The virtual channel structure is defined by labeling stored content. A mobile terminal 110 can select a labeled "channel" or "station" from a defined set. The defined set may be statically set in the terminal, or dynamically assigned by the network 100, 200. As indicated above, the mobile terminal 110 provides an inter face for selecting a content channel, which triggers the transmission of a signal across the network 100, 200. As discussed further below in conjunction with FIG. 4, an application server process 400 evaluates an index indicating the content that is to be shown for the specified content channel at the current time, and translates the requested channel to specific content. The indicated content can be directly delivered to the terminal 110, or an address or link can be provided to the terminal 110. The content may be a continuous stream that the user taps into, such as a live television broadcast, or a finite-length clip, such as a music video or news update. In this latter case, the entire clip can be transmitted when the channel is selected. In the former case, the user simply begins receiving content as it is presented. Optionally, premium accounts may allow users to select historical broadcasts, such that the user can select not only the channel, but also the date and time to watch.

Figure 3:
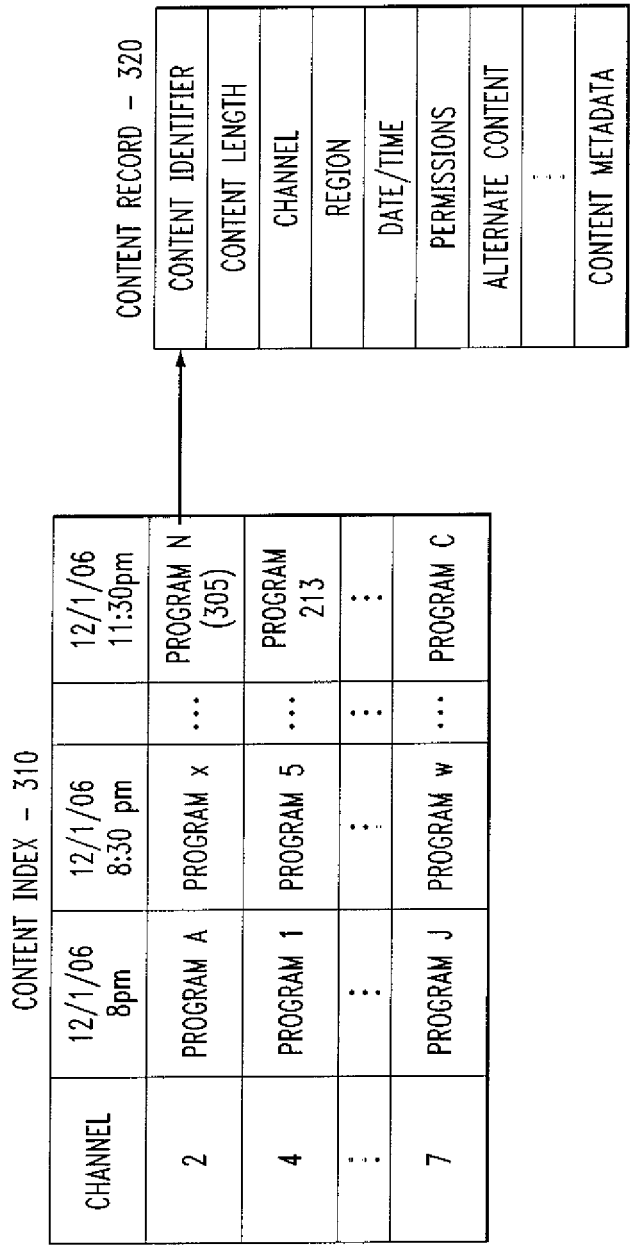
FIG. 3 is a sample table describing an exemplary implementation of a content database incorporating features of the present invention.

FIG. 3 is a sample table describing an exemplary implementation of a content database 300 incorporating features of the present invention. As shown in FIG. 3, the content is labeled with a number of labels so that the application server process 400 can identify the requested content.

In the exemplary implementation shown in FIG. 3, the content database 300 comprises an index 310, such as a program guide, indicating the content that is to be shown for the specified channel for the indicated date and time. For each program, the index 310 indicates the date/time and channel associated with the program. Each program identified in the index 310, such as program N in record 305 of the index 310, preferably has an associated content identifier that can be used as a pointer into a content record 320 associated with the content.

The exemplary content record 320 shown in FIG. 3 comprises a unique identifier for the content and an indication of the content length In addition, the channel, region, date/time and permissions associated with the content are also recorded. The "region" identifier allows a Mobile Broadcaster to license channels in national, regional or local contexts. Thus, the "region" parameter is matched to the user's location in the network. For example, a local news channel would label content as intended for the New York or Los Angeles metropolitan areas. A region code scheme can be set by the mobile broadcaster to allow specificity down to the resolution provided by the location information available on the terminals 110. It is noted that the content can be pushed to a local server, in which case the region may be implied by the location of the content, and not explicitly labeled in the record 320 associated with the content. It is likely, however, that a central distribution mechanism would still require such a label to place the content at the local distribution site.

Traditional networks have boundaries based on physical location, so local content can be provided by dividing viewers geographically by the location of the connection. To implement regional content channels in a wireless network, the user's location must be acquired from a moving terminal Location can be determined, for example, by polling a UPS receiver on a terminal, polling the network for the location of the BTS communicating with the terminal, or triangulating position based on signal strength of multiple base stations with which the terminal is monitoring. In addition, as the user is mobile he or she needs a predictable experience as his or her local region changes. For instance, a sports channel can show local games, but should not necessarily switch the game for a user who drives from one state to another. However, a user may prefer a weather service to provide the local weather based on the user's current location. Accordingly, some content might be classified as non-mobile automatically, and some content might be classified as non-mobile by the user.

An advertisement specific to one local region can be made available in other nearby regions to ensure that the advertisement doesn't suddenly become unavailable in the middle of playback. In addition, a region-based content channel in New York City could provide tourist information at a neighborhood granularity, such as "Times Square," or "Central Park." Local content can be automatically inserted based on the location, such as maps of the area or a walking tour guide.

The date and time indicator in the record 320 is used to refresh content. The date and time indicator would specify the range of time for which the content is considered valid or the "active" content, as well as an optional service of allowing users to view archived content. A special code in this field can indicate CONTENT_NO_EXPIRE, for content which is always available and shown, or CONTENT_CONTINUOUS, for content that continuously streams much as traditional television does. An example of CONTENT_NO_EXPIRE is a looped broadcast similar to those shown on hotel channels, in which the same content is used for months or years.

A permissions field in the record 320 indicates the necessary permissions a user needs to view the content. The interpretation of the code is an implementation detail beyond the scope of the present invention, but could include a bit field to which a logical AND is applied against a permissions field from the user's account information. A non-zero result would indicate sufficient permissions. Such schemes allow a great deal of flexibility in arranging packages, with minimal overhead. These permissions can also be used if the network is dynamically assigning channels to the user, to determine if the channel itself should be made available to a given user. In addition, a user can have a plurality of identities that can be used to provide the appropriate content at the appropriate time. For example, the user can be thought of as a genetic subscriber with a certain service tier. In addition, the user can have a unique identifier for personal content. The generic identifier can be used for widely available channels.

The alternate content field in the record 320 can optionally point to media that is broadcast to a user in the event that the user does not have proper permission to view the requested content channel. For instance, a video preview can be presented with instructions on how to order a pay-per-view movie for users who have not yet purchased the program.

The content metadata field in the record 320 can store information regarding the program for enhanced features, such as program information for a movie. For example, the content metadata field can indicate the title and genre for each program, as well as other well-known attributes, such as actors, duration, and description of the program. In this manner, the content metadata field can optionally be searched by a user to identify programs of interest.

Application Processes

Figure 4:
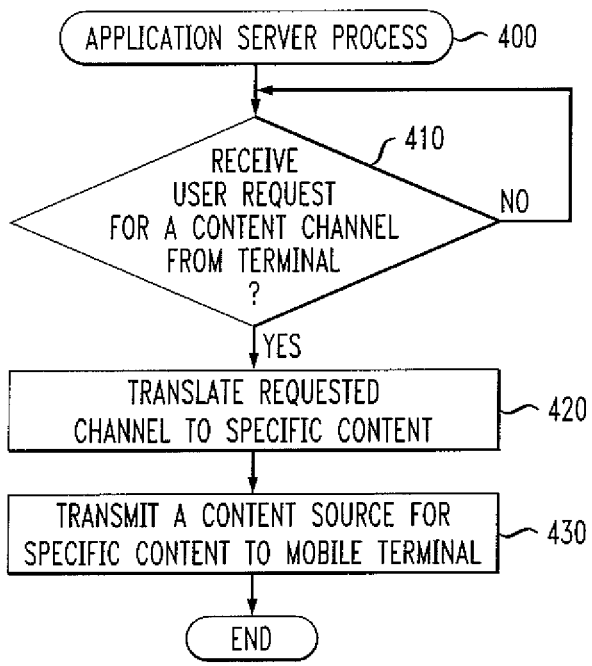
FIG. 4 is a flow chart describing an exemplary implementation of a application server process incorporating features of the present invention.

FIG. 4 is a flow chart describing an exemplary implementation of an application server process 400 incorporating features of the present invention. The application server process 400 can be implemented, for example, by an existing node in the wireless networks 100, 200, such as a BTS 220, an RNC 260, or a content server 280, or a dedicated application server (not shown). As shown in FIG. 4, the application server process 400 performs a test during step 410 to determine it a user request for a content channel has been received from a terminal 110, 210. Once it is determined during step 410 that a user request for a content channel has been received, then program control proceeds to step 420, where the requested channel is translated to the specific content. The requested channel is translated to the specific content by processing the content index 310 and corresponding content record 320 (FIG. 3). A determination can optionally be made to determine if there are any regional preferences applicable to the selected content channel. Based on the information recorded in the content record 320, a content source associated with the content, such as the content itself, or an address or link for the content, is then transmitted to the requesting mobile terminal 110, 210 during step 430, before program control terminates. The content, address or link can optionally be encrypted.

Figure 5:
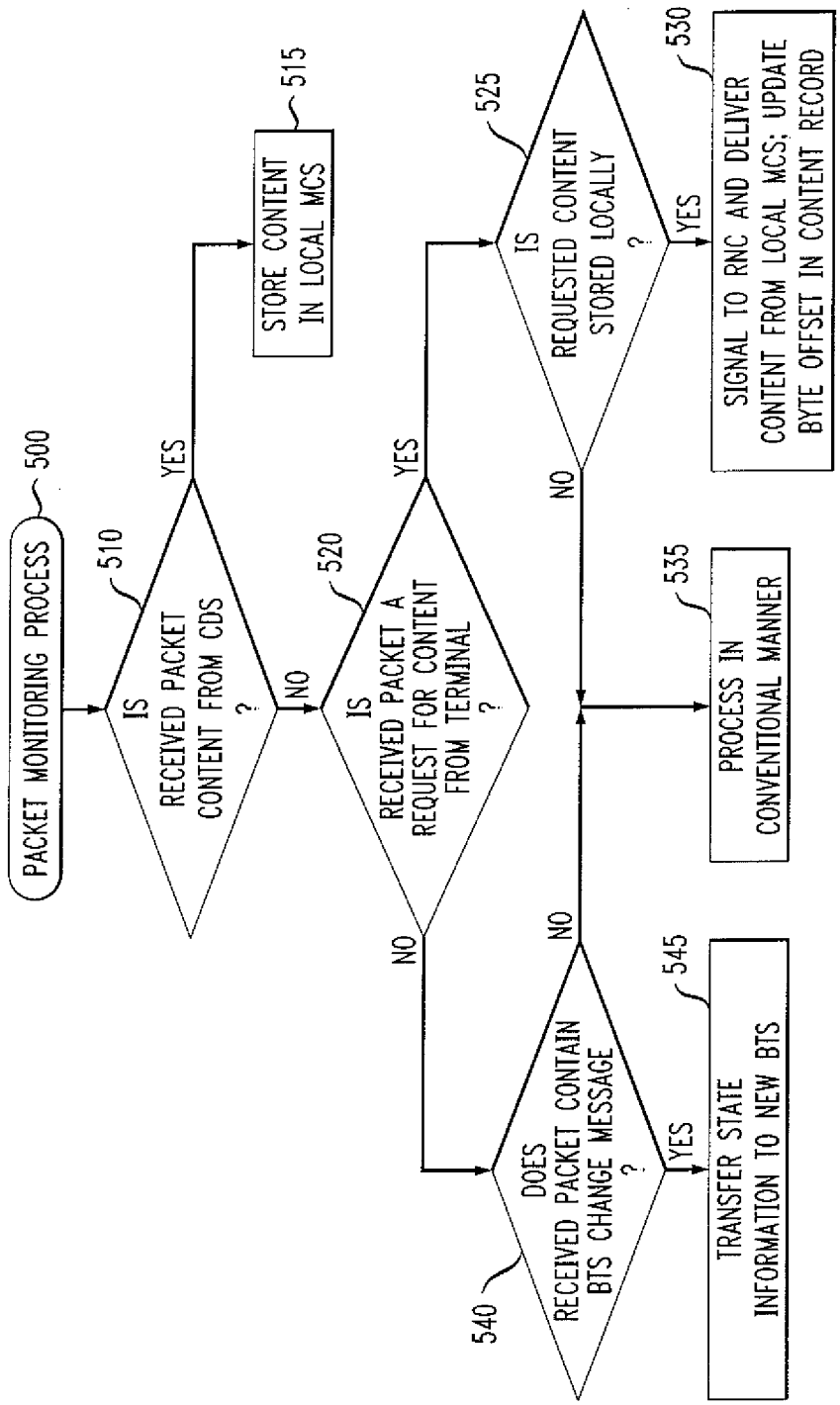
FIG. 5 is a flow chart describing an exemplary implementation of a packet monitoring process incorporating features of the present invention

FIG. 5 is a flow chart describing an exemplary implementation of a packet monitoring process 500 incorporating features of the present invention. For a more detailed implementation of the packet monitoring process 500, see our United States Patent Application, entitled "Methods and Apparatus for Distributed Multimedia Content Supporting User Mobility" As shown in FIG. 5, the packet monitoring process 500 is initiated upon receipt of a packet. A test is performed during step 510 to determine if one or more received packets are content from the content distribution server 280. If it is determined during step 510 that the received packets contain content from the content distribution server 280, then the content is stored in the local media content server 225 during step 515.

If, however, it is determined during step 510 that the received packets are not content from the content distribution server 280, then a further test is performed during step 520 to determine if the received packet is a request for content from a terminal 210. It is assumed that requests for content that are processed during step 510 are requests for actual content. In other words, user requests for a content channel are first processed by the application server process 400, to translate the content channel into actual content (or an address or link for the content).

If it is determined during step 520 that the received packet is a request for content from a terminal 210, then a further test is performed during step 525 to determine if the requested content is stored locally. If it is determined during step 525 that the requested content is stored locally, then the BTS 220 signals to the RNC 260 that the content has been requested and delivers the content from the local media content server 225 during step 530. In addition, the BTS 220 updates the byte offset in the content record during step 530. The BTS 220 may also optionally determine if the mobile terminal 210 is authorized to receive the requested content, based for example, on the permissions information in the content record 320. If, however, it is determined during step 525 that the requested content is not stored locally, then the packet is processed in a conventional manner during step 535.

If it was determined during step 520 that the received packet is not a request fox content from a terminal 210, then a further test is performed during step 540 to determine if the received packet contains a BTS change message (i.e., a handoff is occurring). For example, a BTS change message may comprise a DSC message in accordance with the physical channel structure indicating, for example, that the mobile terminal 210 will retune to a new channel and BTS. The BTS change message may optionally include an indication of the last received packet.

If it is determined during step 540 that the received packet contains a BTS change message, then the content state information in the content state record 300 is transferred to the new BTS 220 during step 545. If however, it is determined during step 540 that the received packet does not contain a BTS change message, then the packet is processed in a conventional manner during step 535.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for delivering broadband content to a mobile terminal in a wireless network, comprising:
    receiving a request for a content channel from said mobile terminal; and
    translating said requested content channel to a corresponding content item based on said requested content channel and a date and time associated with said request, wherein said corresponding content item has multiple versions, wherein a first of at least two coverage regions is associated with a first version of said corresponding content item, wherein a second of said at least two coverage regions is associated with a second version of said corresponding content item, wherein said mobile terminal receives said first version of said corresponding content item when said mobile terminal requests said content item when located in said first coverage region and wherein said mobile terminal continues receiving said first version of said corresponding content item when said mobile terminal enters said second coverage region.

2. The method of claim 1, further comprising the step of evaluating an authorization of said mobile terminal to receive said requested content channel.

3. The method of claim 2, wherein a content source comprises one or more of said corresponding content item, an address or a hyperlink associated with said corresponding content item.

4. The method of claim 3, further comprising the step of transmitting said one or more of said corresponding content item, said address or said hyperlink associated with said corresponding content item to said mobile terminal.

5. The method of claim 2, wherein said translating step further comprises the step of translating said requested content channel to said corresponding content item based on a location of said mobile terminal.

6. The method of claim 2, wherein said corresponding content item includes one or more content components that are based on a location of said mobile terminal.

7. The method of claim 2, wherein said date and time associated with said request is one or more of a current date and time of said request and a requested date and time.

8. An application server in a wireless network for delivering content to a mobile terminal, the application server comprising:
    a memory; and
    at least one processor, coupled to the memory, operative to:
        receive a request for a content channel from said mobile terminal; and
        translate said requested content channel to a corresponding content item based on said requested content channel and a date and time associated with said request, wherein said corresponding content item has multiple versions, wherein a first of at least two coverage regions is associated with a first version of said corresponding content item, wherein a second of said at least two coverage regions is associated with a second version of said corresponding content item, wherein said mobile terminal receives said first version of said corresponding content item when said mobile terminal requests said content item when located in said first coverage region and wherein said mobile terminal continues receiving said first version of said corresponding content item when said mobile terminal enters said second coverage region.

9. The application server of claim 8, wherein said processor is further configured to evaluate an authorization of said mobile terminal to receive said requested content channel.

10. The application server of claim 8, wherein a content source comprises one or more of said corresponding content item, an address or hyperlink associated with said corresponding content item.

11. The application server of claim 10, further comprising the step of transmitting said one or more of said corresponding content item, said address or said hyperlink associated with said corresponding content item to said mobile terminal.

12. The application server of claim 8, wherein said corresponding content item includes one or more content components that are based on a location of said mobile terminal.

13. The application server of claim 8, wherein said date and time associated with said request is one or more of a current date and time of said request and a requested date and time.

* * * * *

UNITED STATES PATENT AND TRADEMARK OFFICE
CERTIFICATE OF CORRECTION

| | | |
|---|---|---|
| PATENT NO. | : 9,037,153 B2 | Page 1 of 1 |
| APPLICATION NO. | : 11/614398 | |
| DATED | : May 19, 2015 | |
| INVENTOR(S) | : Mary S. Chan et al. | |

It is certified that error appears in the above-identified patent and that said Letters Patent is hereby corrected as shown below:

Specification

In Column 1, lines 10 and 11, replace "patent application Ser. No. 11/614,371" with --patent No. 8,718,646--.

In Column 1, line 43, replace "(World Wide Web) The" with --(World Wide Web). The--.

In Column 1, line 67, replace "however; where" with --however, where--.

In Column 2, line 29, replace "one or mote" with --one or more--.

In Column 2, line 66, replace "of a application" with --of an application--.

In Column 3, line 3, replace "present invention" with --present invention.--.

In Column 3, line 44, replace "by gem e," with --by genre,--.

In Column 4, line 13, replace "1×EV-DO" with --1×EVDO--.

In Column 4, line 20, replace "air inter face" with --air interface--.

In Column 4, line 42, replace "out United States" with --our United States--.

In Column 4, line 53, replace "one or mote" with --one or more--.

In Column 5, line 35, replace "with FIG. 3" with --with FIG. 3.--.

In Column 5, line 44, replace "an inter face" with --an interface--.

In Column 6, line 11, replace "content length" with --content length.--.

In Column 6, line 31, replace "moving terminal Location" with --moving terminal. Location--.

In Column 7, line 39, replace "it a user" with --if a user--.

In Column 8, line 27, replace "a request fox" with --a request for--.

Signed and Sealed this
Twelfth Day of April, 2016

Michelle K. Lee
*Director of the United States Patent and Trademark Office*